United States Patent
Vasko et al.

(10) Patent No.: US 9,152,144 B2
(45) Date of Patent: Oct. 6, 2015

(54) DIRECTORY CONTENT RESOLUTION

(75) Inventors: David A. Vasko, Solon, OH (US); Raymond J. Staron, Chagrin Falls, OH (US); Charles Martin Rischar, Chardon, OH (US); Kenwood H. Hall, Hudson, OH (US); Subbian Govindaraj, Solon, OH (US); Robert J. Kretschmann, Bay Villiage, OH (US); Michael D. Kalan, Highland Heights, OH (US); Paul R. D'Mura, Glendale, AZ (US); Taryl J. Jasper, South Euclid, OH (US); Eugene Liberman, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1954 days.

(21) Appl. No.: 12/191,741

(22) Filed: Aug. 14, 2008

(65) Prior Publication Data

US 2010/0042586 A1    Feb. 18, 2010

(51) Int. Cl.
*G06F 17/30* (2006.01)
*G05B 19/418* (2006.01)

(52) U.S. Cl.
CPC .. *G05B 19/4183* (2013.01); *G05B 2219/31327* (2013.01)

(58) Field of Classification Search
CPC ....... G07F 7/04; H04L 67/1097; H04L 69/14; H04L 69/40; H04N 19/124; H04N 19/137; H04N 19/152; H04N 19/182
See application file for complete search history.

(56) References Cited

U.S. PATENT DOCUMENTS

| | | |
|---|---|---|
| 6,952,737 B1 | 10/2005 | Coates et al. |
| 6,980,985 B1 | 12/2005 | Amer-Yahia et al. |
| 7,054,910 B1 | 5/2006 | Nordin et al. |
| 7,120,690 B1 | 10/2006 | Krishnan et al. |
| 7,278,065 B2 | 10/2007 | Conkel |
| 7,305,451 B2 | 12/2007 | San Andres et al. |
| 7,313,598 B1 | 12/2007 | Sheth |
| 7,315,854 B2 | 1/2008 | Kumar |
| 7,363,432 B2 | 4/2008 | Gschwind et al. |
| 7,376,675 B2 | 5/2008 | Pruet, III |
| 2005/0114401 A1* | 5/2005 | Conkel .......................... 707/200 |
| 2006/0195486 A1* | 8/2006 | Ohno et al. .................... 707/200 |
| 2007/0055385 A1* | 3/2007 | Mann et al. ....................... 700/1 |

* cited by examiner

*Primary Examiner* — Anteneh Girma
(74) *Attorney, Agent, or Firm* — Amin, Turocy & Watson, LLP

(57) ABSTRACT

In a distributed directory configuration, different nodes can retain information pertinent an industrial control configuration. As information changes in one node, replicas of the information in other nodes can be updated. However, updating can take time and a query can be run upon the directory while nodes have conflicting information. Conflicting information can be identified and resolved such that a query obtains a correct answer.

9 Claims, 10 Drawing Sheets

DIRECTORY CONTENT RESOLUTION

TECHNICAL FIELD

The subject specification relates generally to industrial control configuration directories and in particular to resolving discrepancies within a directory.

BACKGROUND

Industrial control environments can typically involve complex mechanical, electronic, electromechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In an industrial control configuration with a distributed directory there can be different directory nodes that retain information. A change can be made upon one node that alters information—based on a variety of constraints, the information can be propagated upon the other nodes or the change can be globally rejected. However, as the constraints are analyzed, a request can be made upon the distributed directory to provide information. Since different nodes retain different information for an entry, it can be difficult to determine correct information.

With the disclosed innovation, discrepancies in directory information can be resolved, commonly in response to a particular query from a device. A check can be performed determining if information obtained through the query is accurate (e.g., propagated throughout a directory). If the information is not accurate, then resolution can occur to update the information and thus provide an accurate result. Additionally, contrasting information portions can be compared to identify inconsistency and a request can be made to resolve the inconsistency.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
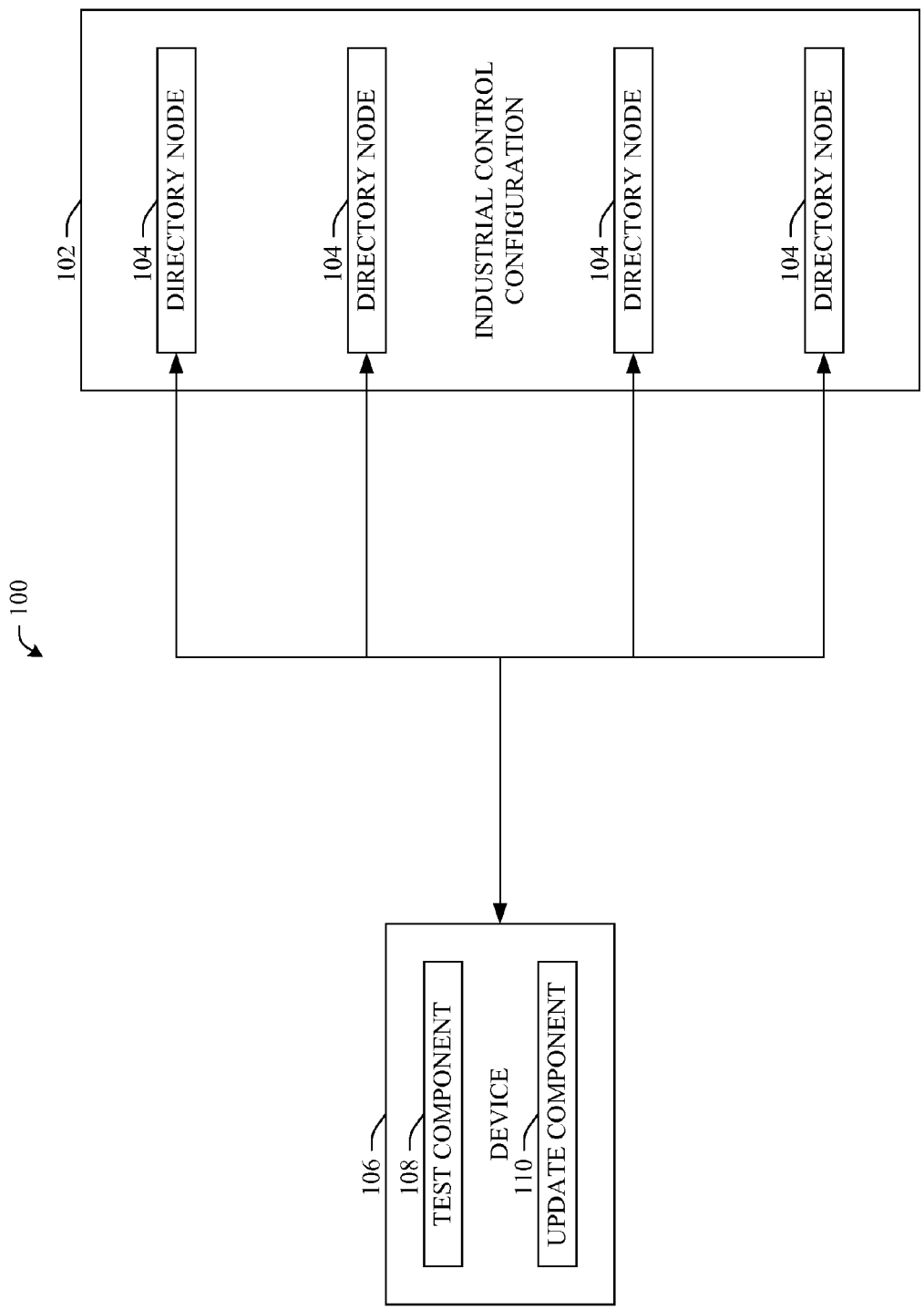
FIG. 1 illustrates a representative industrial control configuration with an ability to evaluate information in a distributed directory in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Now referring to FIG. 1, an example system 100 is disclosed for managing a distributed directory. In an industrial control configuration 102, there can be a distributed directory with multiple directory nodes 104 that retains information related to the configuration 102. The directory nodes 104 can include local information as well as access information retained upon other nodes. For example, in an industrial control process, a mixing bowl can be used to combine ingredients. The different nodes 104 can include characteristic information related to the mixing bowl, such as how the bowl is lined, capabilities of the mixing bowl (e.g., mixing speed), and the like.

However, it is possible that information changes in the distributed directory. For instance, the mixing bowl can be changed from having a glass lining to a metal lining (e.g., glass is removed to expose metal). This change can be placed upon information of one directory node 104, but before the change is propagated among the other directory nodes 104, there can be a requirement that a technician authorize the propagation. Thus, different nodes 104 can retain different values for one entry (e.g., one node states the bowl is metal lined while another states the bowl is glass lined).

A device 106 can access the industrial control configuration 102 and run a query asking for lining of the mixing bowl. Depending on the directory node 104 checked, different answers can be provided (e.g., glass lined or metal lined). A test component 108 can establish if information provided to the device 106 is accurate (e.g., a lining of the mixing bowl). An update component 110 can determine accurate information if the test component 108 establishes that the information is not accurate.

The update component 110 can determine accuracy through analyzing multiple nodes and making an estimation on which node includes correct information, making a direct request to the industrial control configuration 102 to provide accurate information, monitoring how information is propagated upon different directory nodes 104, and the like. Once the update component 110 determines accurate information, assistance can be provided to the industrial control configuration 102 to correct inaccurate directory nodes, such as performing propagation from the update component 110 in addition to a portion of the industrial control configuration 102. According to one embodiment, the information that has accuracy established by the test component 108 is provided through a query of the device 106 upon the industrial control configuration 102. Moreover, the system 100 can be implemented such that the information provided to the device is provided from a distributed directory.

While being disclosed as part of query resolution, the test component 108 and/or the update component 110 can also configure to operate independent of a query. The test component 108 can evaluate a directory and determine that information included upon the directory is inconsistent. Based upon the inconsistency, the update component 110 can determine correct information and can propagate the information throughout the directory.

It is to be appreciated that while the test component 108 and update component 110 are depicted as being part of the device 106, other implementations can be practiced. For example, the test component 108 and/or update component 110 can be part of the industrial control configuration 102, have portions spread among the device 106 and industrial control configuration 102, be part of an independent device (e.g., a device that does not run a query), and the like.

Figure 2:
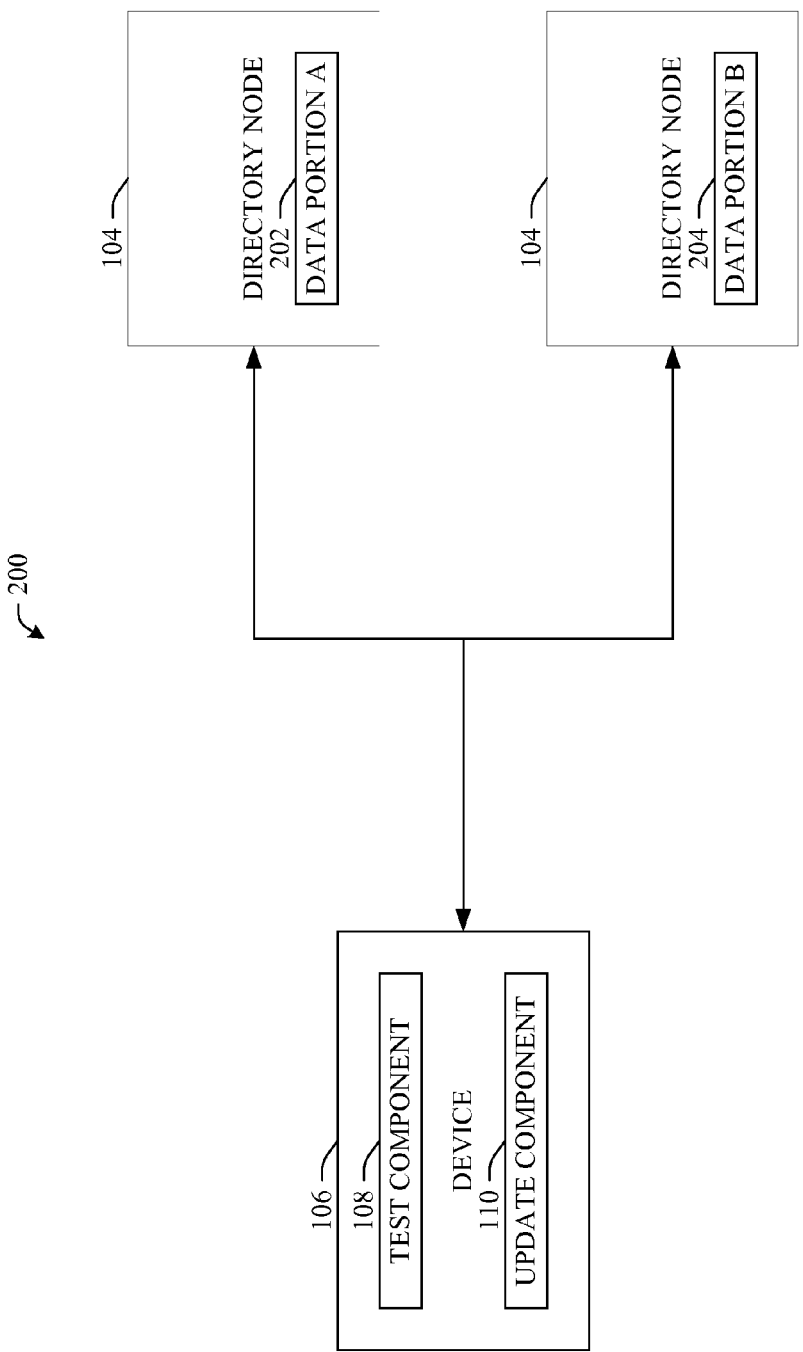
FIG. 2 illustrates a representative distributed directory with varying information and an ability to manage the varying information in accordance with an aspect of the subject specification.

Now referring to FIG. 2, an example system 200 is disclosed for evaluating a directory of an industrial control configuration. A device 106 can communicate with a distributed directory that has at least two directory nodes 104. In the distributed directory, there can be two data portions representing an entry: data portion A 202 and data portion B 204. For example, data portion A 202 can disclose that a mixing bowl is clean while data portion B 204 states the mixing bowl is not clean.

The test component 108 can access the directory nodes 104 and evaluate data portion A 202 and data portion B 204. A comparison of the data portions can show that the data portions are not equal and thus an accurate entry of the directory is not easily discernable. The update component 110 can analyze the directory to determine which data portion is accurate.

For example, the test component 108 can analyze the directory and learn from data portion A 202 that the mixing bowl is clean. In continuing analysis, the test component 110 can learn that data portion 204 states the mixing bowl is not clean. While one data portion is correct and one is not correct, the test component 108 is unsure which one is correct. The update component 110 can observe that data portion B 204 replaces data portion A 202 (e.g., data portion B 204 is propagated) and thus determines that data portion B 204 is accurate.

According to an alternate embodiment, the device 106 can access data portion A 202 and assume information contained is correct. The test component 108 can continue to analyze the directory nodes 104 and determine there are two different entries. The test component 108 can instruct the device 106 to stop using data portion A 202 until the update component 110 resolves a data portion to use. Thus, information is assumed accurate unless there is a reason for accuracy to be placed into question.

Additionally, the update component 110 can operate in a passive state. For example, if the test component 108 establishes that information is not accurate, the update component 110 can make a request to the directory that there be a notification sent upon resolving a discrepancy. In this example, the update component 110 does not seek out a response and merely waits for the directory to provide a correct result. The update component 110 can send periodic reminders in an attempt to obtain a correct result. Thus, determining accurate information can include collecting a notice from an auxiliary source on what is accurate.

Figure 3:
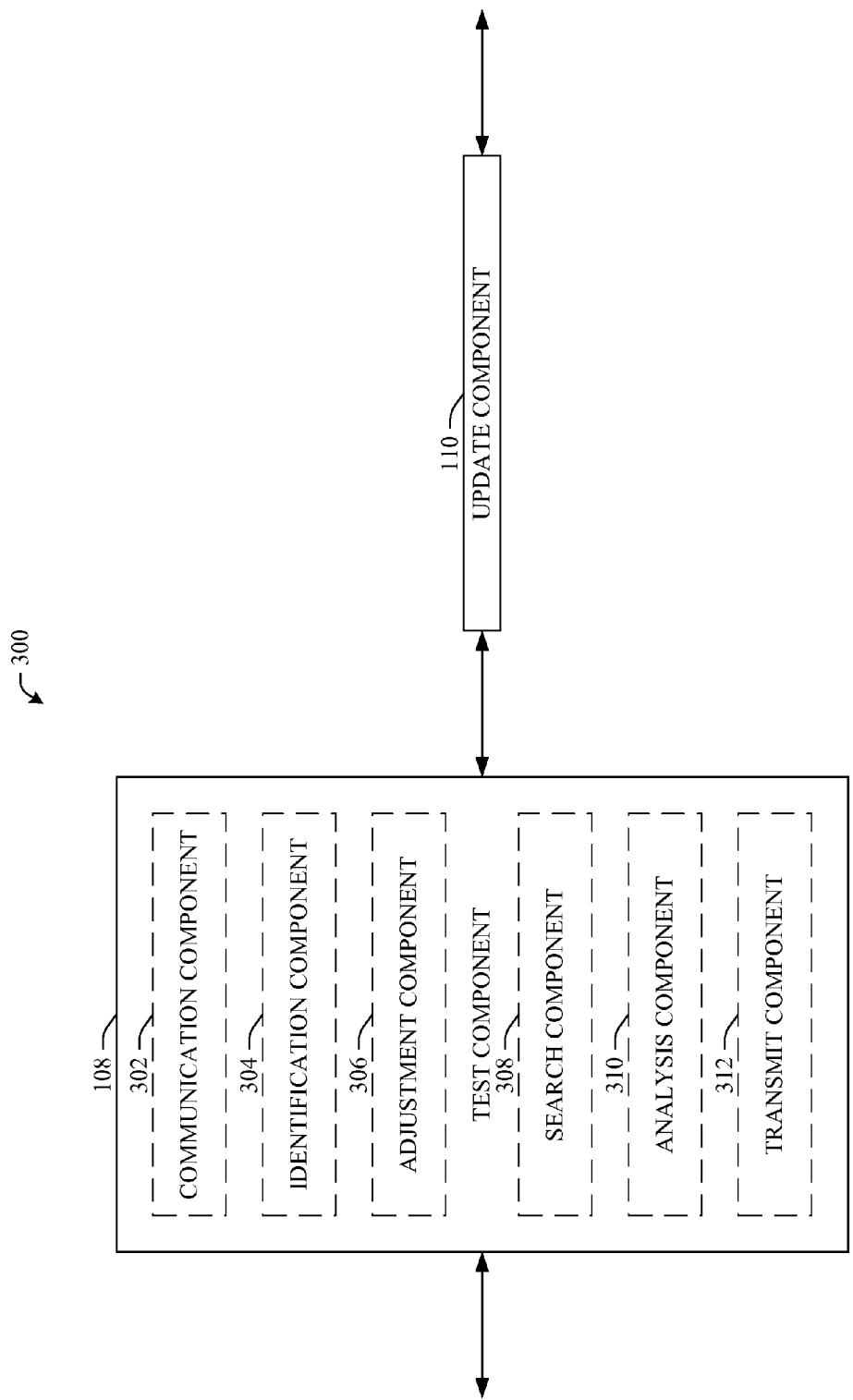
FIG. 3 illustrates a representative distributed directory information management system with a detailed test component in accordance with an aspect of the subject specification.

Now referring to FIG. 3, an example system 300 is disclosed for managing information evaluation of a distributed directory with a detailed test component 108. The test component 108 can establish if information located in a distributed directory is accurate. This can be done through comparing varying results as well as through observation. For example if a directory states a mixing bowl is clean, the test component 108 can make a direct inquiry to the mixing bowl to determine if the information is correct. Storage can be used to retain the result, where the result can be aggregated with other results and a trustworthiness of the directory and/or a directory node can be established.

A communication component 302 can engage with other devices to transfer information, such as to send a query to the distributed directory, communicate with auxiliary sources, and the like. Operation can take place wirelessly, in a hard-wired manner, employment of security technology (e.g., encryption), etc. Information transfer can be active (e.g., query/response, product/consumer, etc.) or passive (e.g., monitoring of communication signals). Moreover, the communication component 302 can utilize various protective features, such as performing a virus scan on collected data and blocking information that is positive for a virus.

It is possible for the test component 108 to evaluate different type of directories (e.g., the test component 108 is in a device that moves from a configuration with a single directory to a configuration with a distributed directory) and/or for a directory format of an industrial control configuration to change. The test component 108 can employ an identification component 304 that determines a classification of information communication (e.g., a directory type) of the industrial control configuration. The identification component 304 can retain in storage a classification type for an industrial control configuration that can be used if the system 300 re-engages the industrial control configuration.

An adjustment component 306 can calibrate operation of the test component 108 based upon the determined classification. Additionally, the adjustment component 306 can change operation of the update component 110 as well as other components disclosed herein. For example, the adjustment component 306 can collect feedback on how long determinations take to be made and the adjustment component 306 can attempt to increase speed of operation.

The device 106 of FIG. 1 can generate a query to obtain information. A search component 308 can navigate the directory to discover information that can answer the query. Additionally, the search component 308 can evaluate different directory nodes to identify a node that is likely to have information relevant in answering a query.

Information discovered by the search component 308 can be evaluated by an analysis component 310 to determine if the information responds to the query. A result of the analysis can be used to determine if information is accurate. In addition, the analysis component 310 can perform comparisons of information to identify if information is accurate.

It can be beneficial for an industrial control configuration to learn information provided in at least a portion of a directory is not accurate. Therefore, the test component 108 can use a transmit component 312 that transfers a notice that the provided information is not accurate. The system 300 can use an update component 110 that determines accurate information if the test component 108 establishes that the information is not accurate.

Figure 4:
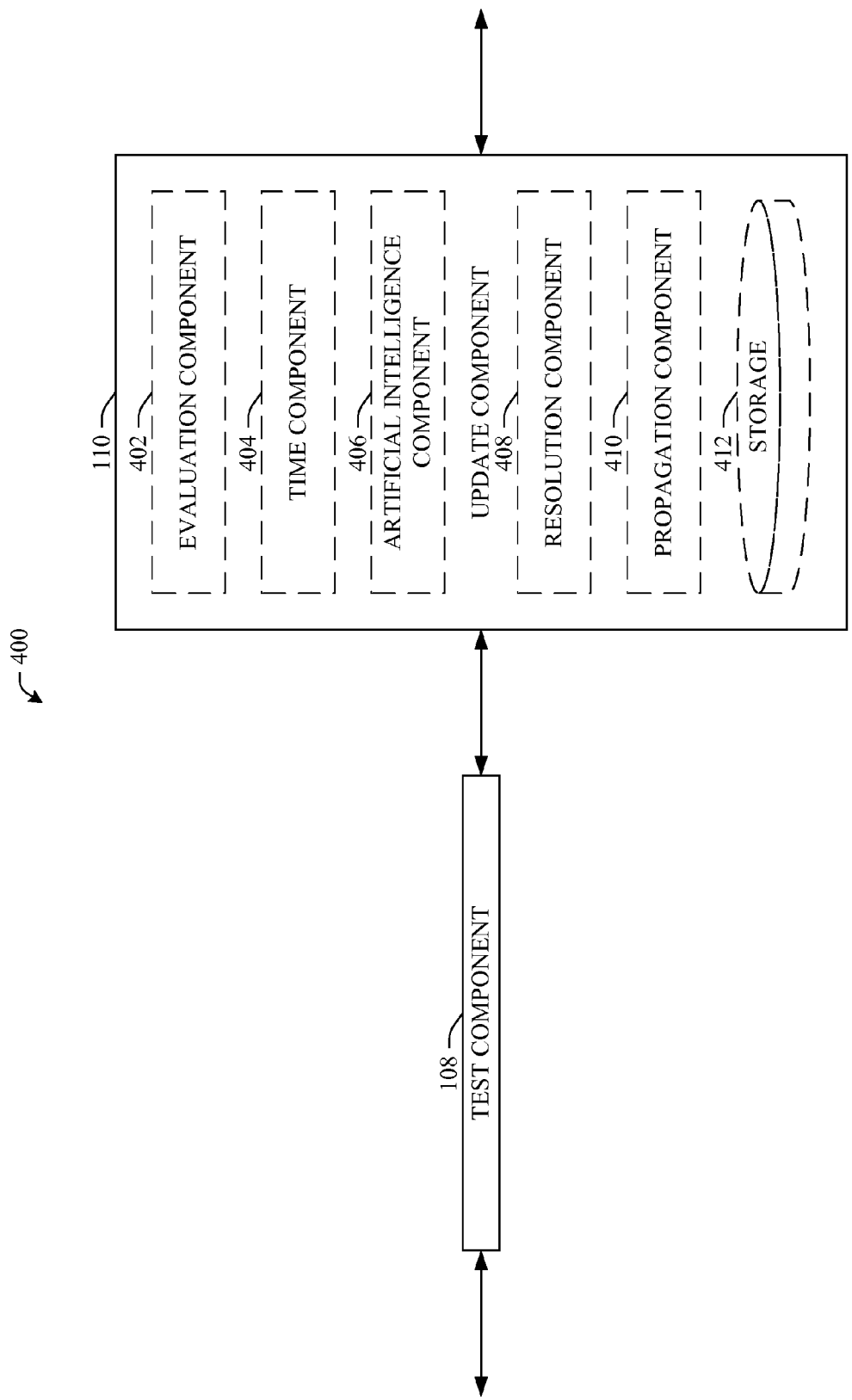
FIG. 4 illustrates a representative distributed directory information management system with a detailed update component in accordance with an aspect of the subject specification.

Now referring to FIG. 4, an example system 400 is disclosed for managing information evaluation of a distributed directory with a detailed update component 110. The system 400 can employ a test component 108 that establishes if information provided to a device is accurate. An update component 110 can determine accurate information if the test component 108 establishes that the information is not accurate.

An evaluation component 402 can determine if the information provided is critical. If information is not critical, then it can be a waste of resources to attempt to find accurate information. Thus, in one configuration, the update component 110 can obtain accurate information to replace critical non-accurate information if the determination is that the information is not accurate and the information is critical. If information is not critical, then the system 400 can continue without determining critical information. The evaluation component 402 can function as means for designating information that is critical in a response from a query upon a directory.

In an illustrative instance, a query can be to locate a mixer located in an industrial control configuration. A response to the query can produce mixer location and metadata on the mixer. Since the query requested location information, the metadata can be considered non-critical. Therefore, even if the metadata is not accurate, it can be considered a waste of resources to make the metadata accurate and thus the update component 110 could configure to not determine accurate information when the information is not critical.

One manner of determining if information is accurate is based upon the time of information. A time component 404 can be used to evaluate instance data for use in determining information accuracy. For example, there can be two data portions that are conflicting if a mixing bowl is clean. If one data portion is dated later than another, then an inference can be drawn that the data portion updated later in time is accurate and thus through use of the time component 404, the update component 110 can designate accurate information.

An artificial intelligence component 406 can be used in performing various determinations and inferences disclosed herein. The artificial intelligence component 406 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 406 can also include methods for capture of logical relationships such as theorem provers or more heuristic rule-based expert systems. The artificial intelligence component 406 can be represented as an externally pluggable component, in some cases designed by a disparate (third) party. It is to be appreciated that inferences or determinations discussed in the subject specification can be implemented through use of artificial intelligence techniques.

A resolution component 408 can conclude information that is accurate from the directory. For example, the time component 404 can suggest that one data portion is accurate while observation of the industrial control configuration can suggest another data portion is accurate. The resolution component 408 can evaluate different metadata to assist in determining information that is accurate. The resolution component 408 can operate as means for determining if information designated as critical is accurate.

Once information is determined to be accurate, an inference can be drawn that the information should be placed into a directory. Therefore, the update component 110 can employ a propagation component 410 to replace information in the directory. According to one embodiment, the industrial control configuration can manage operation of the propagation component 410. The propagation component 410 can function as means for replacing critical information that is not recent with recent information while the transmit component 312 of FIG. 3 operates as means for transferring a notice that identifies non-recent information.

Different pieces of information, such as directory locations, component operating instructions (e.g., communication component 302 of FIG. 3), components themselves, etc. can be held on storage 412. Storage 412 can arrange in a number of different configurations, including as random access memory, battery-backed memory, hard disk, magnetic tape, etc. Various features can be implemented upon storage 412, such as compression and automatic back up (e.g., use of a RAID configuration). In addition, storage 412 can operate as memory that can be operatively coupled to a processor (not shown).

Figure 5:
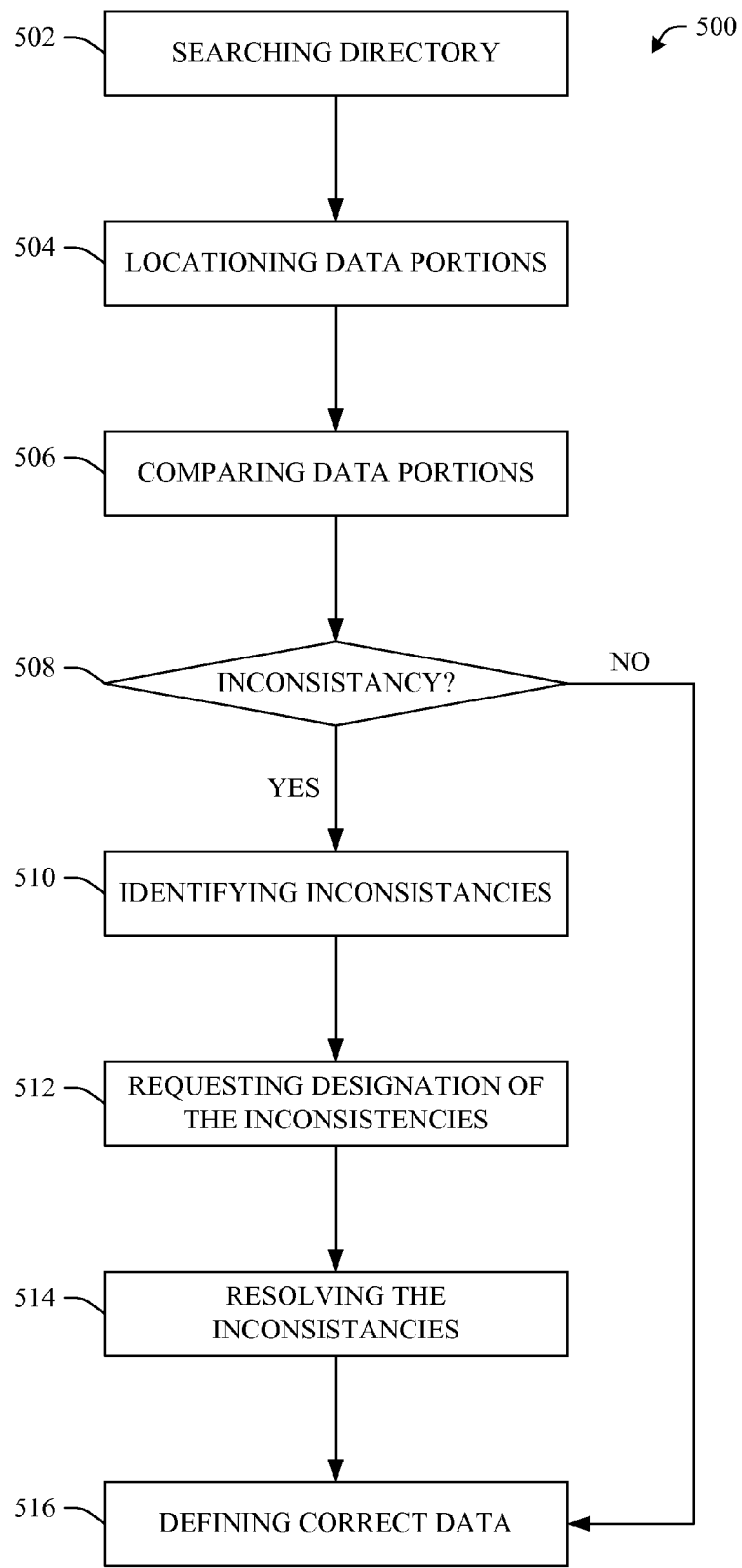
FIG. 5 illustrates a representative information inconsistency management methodology in accordance with an aspect of the subject specification.

Now referring to FIG. 5, an example methodology 500 is disclosed for managing propagation upon a distributed directory. The directory can be identified, accessed and searched at action 502. While searching can include analyzing entries in the directory, searching can also include more effective solutions. For example, a directory can be organized as a series of folders and specific searches relating to a query can be searched.

As part of the search, specific data portions can be located through event 504. Artificial intelligence techniques can be used to locate portions that match a query submitted. Comparing at least two data portions that are responsive to the query can occur at act 506. According to one embodiment, identification of inconsistencies can occur based upon a result of the comparison.

A check 508 can take place to determine if there is an inconsistency among discovered data portions. If there is an inconsistency determined through the check 508, then specific inconsistencies can be identified at act 510. Thus, act 510 can function as identifying that there are inconsistent data portions in response to a query.

A request can be made to resolve the inconsistency at action 512 (e.g., designating the inconsistency). In one implementation, a device independent of the industrial control configuration can make a request to have resolution occur. However, the industrial control configuration can make the request by scheduling resolution to occur or accessing resources to make the resolution.

The inconsistent information can be resolved through event 514. Resolution can at least in part occur upon a device, the industrial control configuration, and the like. Various metadata can be analyzed to determine information that should be designated as correct. Checks can be run on why an inconsistency occurs and results of the checks can be evaluated to determine which data portion is correct.

At act 516, correct data can be defined as a result of the inconsistency resolution. In addition to defining correct data, a likelihood of the defined data being correct can also be calculated and provided. For example, a worker could erroneously change data and have it propagate—while the data is correct (e.g., what is to be placed in the directory), the data can still be erroneous. Also, if the check 508 determines that there is not an inconsistency (e.g., any inconsistency, a substantial inconsistency, etc.), then the methodology 500 can continue to act 516.

Figure 6:
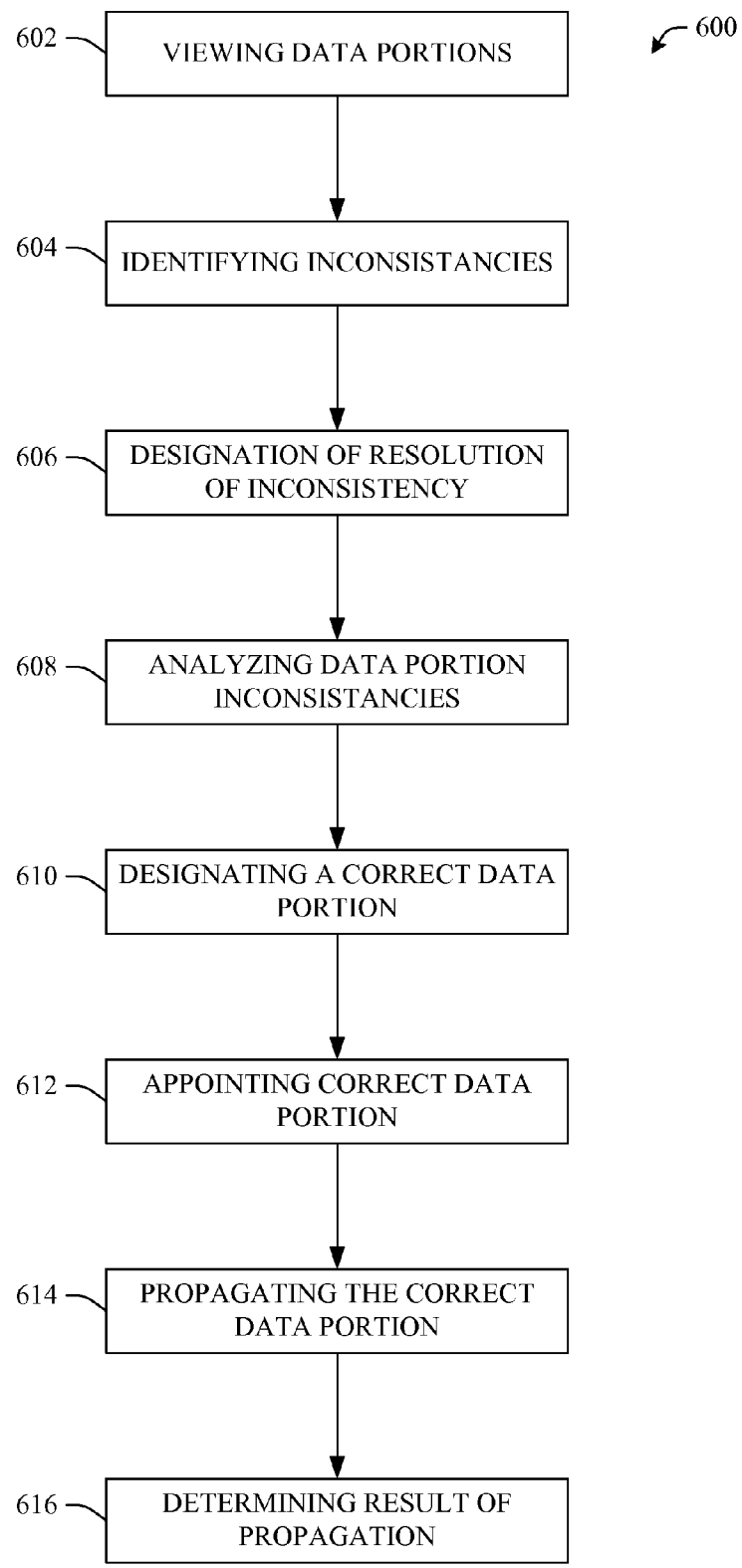
FIG. 6 illustrates a representative methodology for designating correct information in a distributed directory in accordance with an aspect of the subject specification.

Now referring to FIG. 6, an example methodology 600 is disclosed for propagating a data portion determined to be correct through a directory, commonly a distributed directory. Related data portions of the distributed directory can be analyzed and viewed at act 602. Related data portions can include portions that are intended to retain identical data (e.g., capabilities of a mixer).

Inconsistencies among data portions can be identified at action 604. Specifically, related data portions can be compared against one another to identify an inconsistency. If information is substantially different, then there can be a designation of an inconsistency. A substantial difference can include a difference above a predetermined tolerance, values within a percentage of one another, data with minor spelling errors, and the like.

Resolution of at least one identified inconsistency can be designated at action 606. A third party device can request that the inconsistency be resolved, the industrial control configuration can schedule a time for resolution, resources can be appointed for resolution and the like. Resolution can include defining correct and/or accurate information, making a directory consistent, etc.

The different data portions can be individually analyzed at act 608. Specifically, history of the data portions, parties associated with data portions, various circumstances (e.g., likelihood of tampering), and the like can be evaluated. Based upon a result of the analysis, a correct data portion can be designated through event 610 (e.g., selected for propagation). The designated data portion can be appointed as a correct data portion at action 612 such that the data portion is appointed as a response to a query.

According to one embodiment, designation through event 610 can occur on a third party device. Therefore, an industrial control configuration (e.g., through a directory management component) can appoint the correct data portion to be propagated among the directory at action 612. While not shown as part of the methodology 600, it is to be appreciated that the designated portion could be rejected—additionally, another portion can be designated based at least in part upon the rejection.

The designated data portion can be propagated through different nodes of a distributed directory at act 614. Propagation can include replacing all relevant portions regardless of content as well as specifically replacing relevant portions that are different from designated data portions. Various security measures can be used to insure important data is not accidentally overridden during propagation. A result of the propagation can be analyzed at action 616. Analysis can occur as propagation occurs as well as after completion of the propagation. Based upon the analysis, modification can be made to propagation protocol as well as protocol for other portions of the methodology 600.

Figure 7:
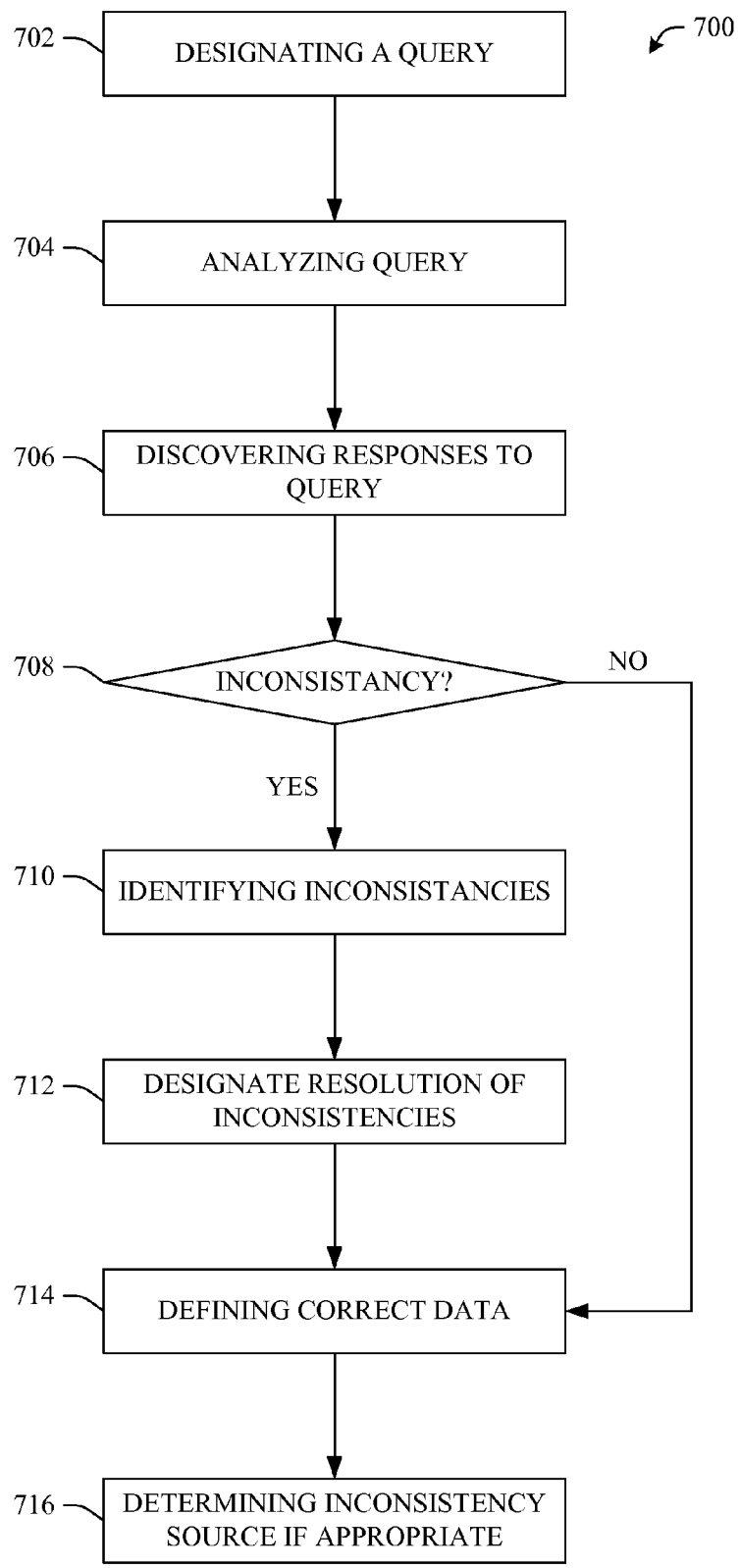
FIG. 7 illustrates a representative methodology for operating a query upon a distributed directory regarding an industrial control configuration in accordance with an aspect of the subject specification.

Now referring to FIG. 7, an example methodology 700 is disclosed for processing a query for information based upon a distributed directory. A query can be generated, collected, and designated to be performed upon a distributed directory at action 702. The query can be analyzed at act 704 to determine information that can answer the query. For example, if a query can include "is there a mixing bowl with glass lining available". A check can be performed if an entity requesting information and/or an entity that is to obtain an answer to the query has authorization to view the information.

The distributed directory can be evaluated and there can be discovering at least one data portion that can respond to the query at action 706. In the aforementioned example with the mixing bowl, a first check can be run to determine if there are any mixing bowls. If there are mixing bowls, a second check can be run to determine if there is a mixing bowl with glass lining.

A check 708 can occur to determine if there is an inconsistency among discovered data portions. If the check 708 determines that an inconsistency exists, then at event 710 there can be identifying that there are inconsistent data portions in response to a query. With a known inconsistency, there can be designating resolution of the inconsistency at act 712. A resolved data portion can be defined as correct data through action 714.

If the check 708 produces a negative result, then the methodology 700 can continue to action 714. It can be possible that not only information portions are consistent with one another, but also that there is only one result in a search of a directory—with only one result, there is no inconsistency. However, a check can be performed to determine if even consistent information is correct (e.g., the directory states the mixing bowl is clean even when the mixing bowl is not clean).

If there is no inconsistency through the check 708, then the methodology 700 can terminate. However, if inconsistencies are determined to exist, then it can be beneficial to determine an origin of the inconsistency, which can be done through act 716. For example, an inconsistency can originate from a relatively slow propagation such that correct information in one directory node is not transferred to other nodes quickly.

If a correction is available, then one can be implemented—such as finding a manner to hasten propagation. However, other operations can change based upon an understood source of inconsistency. For instance, if propagation speed cannot and/or should not be increased, then if an inconsistency is discovered a second check can occur after an estimated propagation time.

Figure 8:
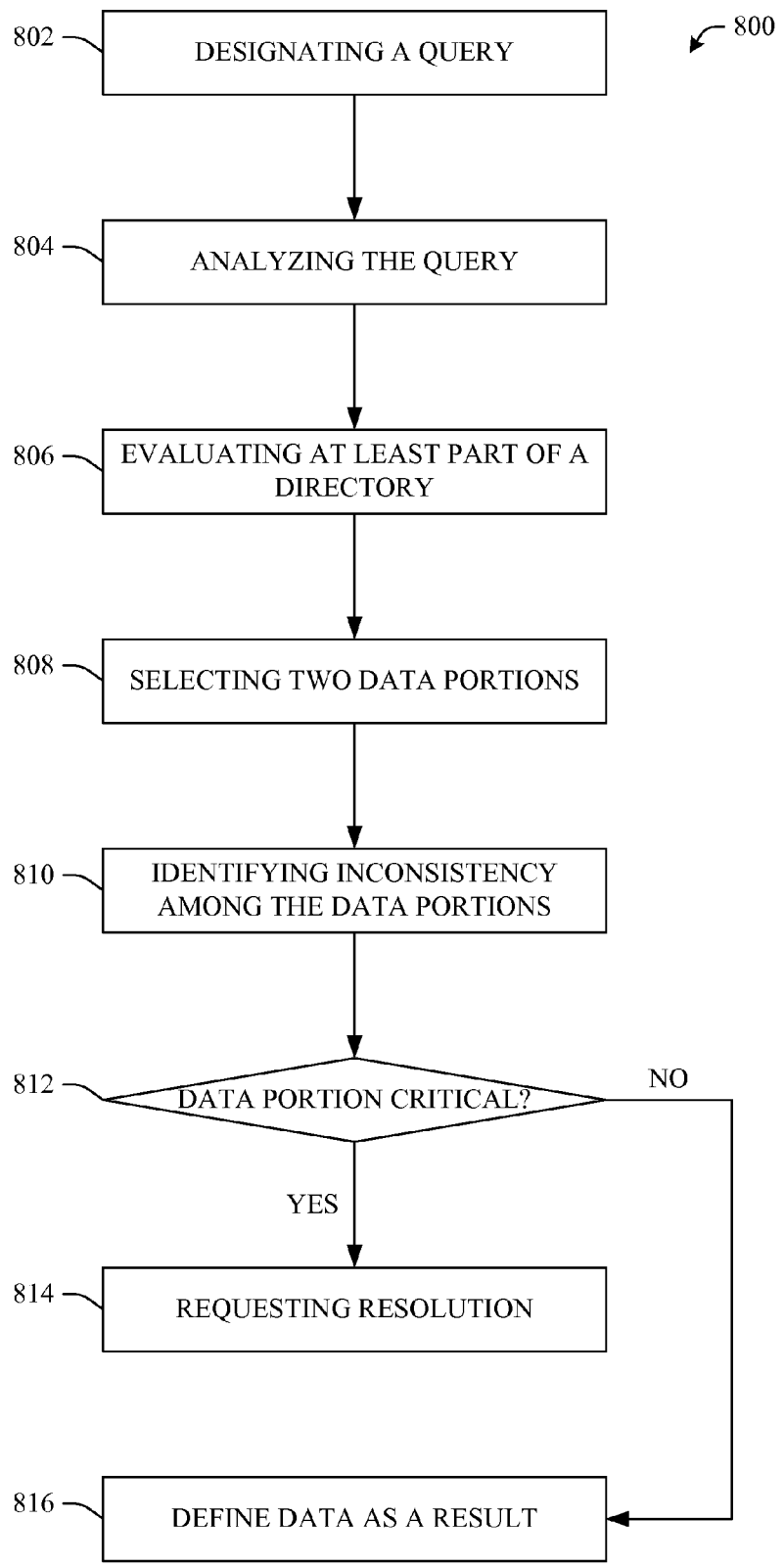
FIG. 8 illustrates a representative methodology for determining if a query response is critical in accordance with an aspect of the subject specification.

Now referring to FIG. 8, an example methodology 800 is disclosed for functioning regarding a distributed directory regarding information searches of critical information. A query can be designated for use upon a distributed directory at action 802. The query can be analyzed at action 804 to determine what is being asked and if the directory can answer the question. For example, the query can ask for information from a database. While the directory can include information on an address of the database, it can be unlikely that the directory include database information itself. According to one embodiment, then methodology 800 can end if the query cannot be or is unlikely to be resolved by searching the directory.

At action 806, the at least a portion of a directory can be analyzed. When an answer is discovered, analysis can stop—however, this can lead to a problem that discovered information is not recent, accurate, correct, and the like. Therefore, the directory can continue to be evaluated to strengthen an answer (e.g., found three places in the directory) or to discover other portions.

Two data portions that are discovered through the analysis can be selected as answers to the query at action 808. The selected data portions can be compared against one another to determine if there is an inconsistency. Based upon a result of the comparison, there can be identifying inconsistency among the data portions at event 810.

In an industrial control configuration, oftentimes it can be important to perform tasks quickly and efficiently. Therefore, if information is not critical to operation, it can be considered a waste of resources to attempt to resolve consistency. Therefore, a check 812 can operate to determine if a data portion is critical. For example, a query could be to ask for capabilities that can be performed by a mixer in an industrial control configuration. However, one the reason the query is asked is in order to compare mixers against one another to find one with the highest mixing capacity.

In response to the query, two different data portions can be discovered communicating information with relation to a mixer. One data portion can state a mixer is glass-lined while another data portion discloses that the mixer is metal lined. While there is clearly an inconsistency, it is likely not critical since the purpose of the query is to discover capacity of available mixing bowls.

If information is determined as critical, then there can be a request to perform resolution at action 814 and resolution can occur. However, if information is designated as not being critical, then a specific data portion can be defined as a result at event 816. Different techniques can be used to define information, such as random selection, selecting a data portion that has a higher likelihood of being correct (e.g., from a more reliable node), and the like.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
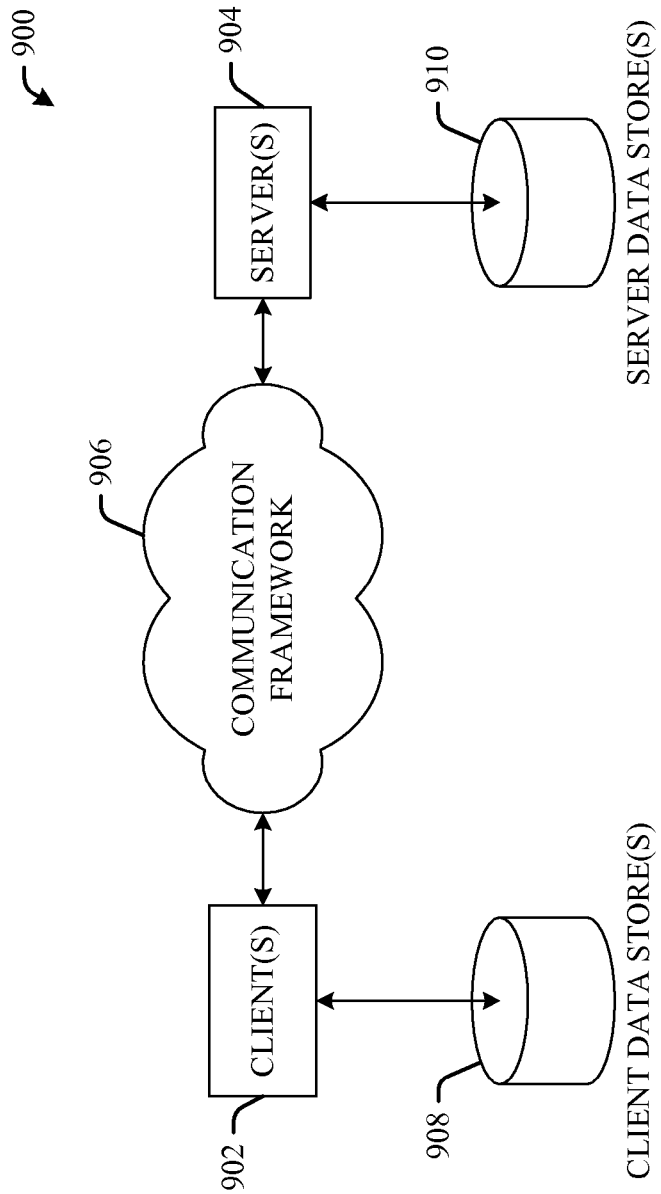
FIG. 9 illustrates an example of a schematic block diagram of a computing environment in accordance with an aspect subject specification.
Figure 10:
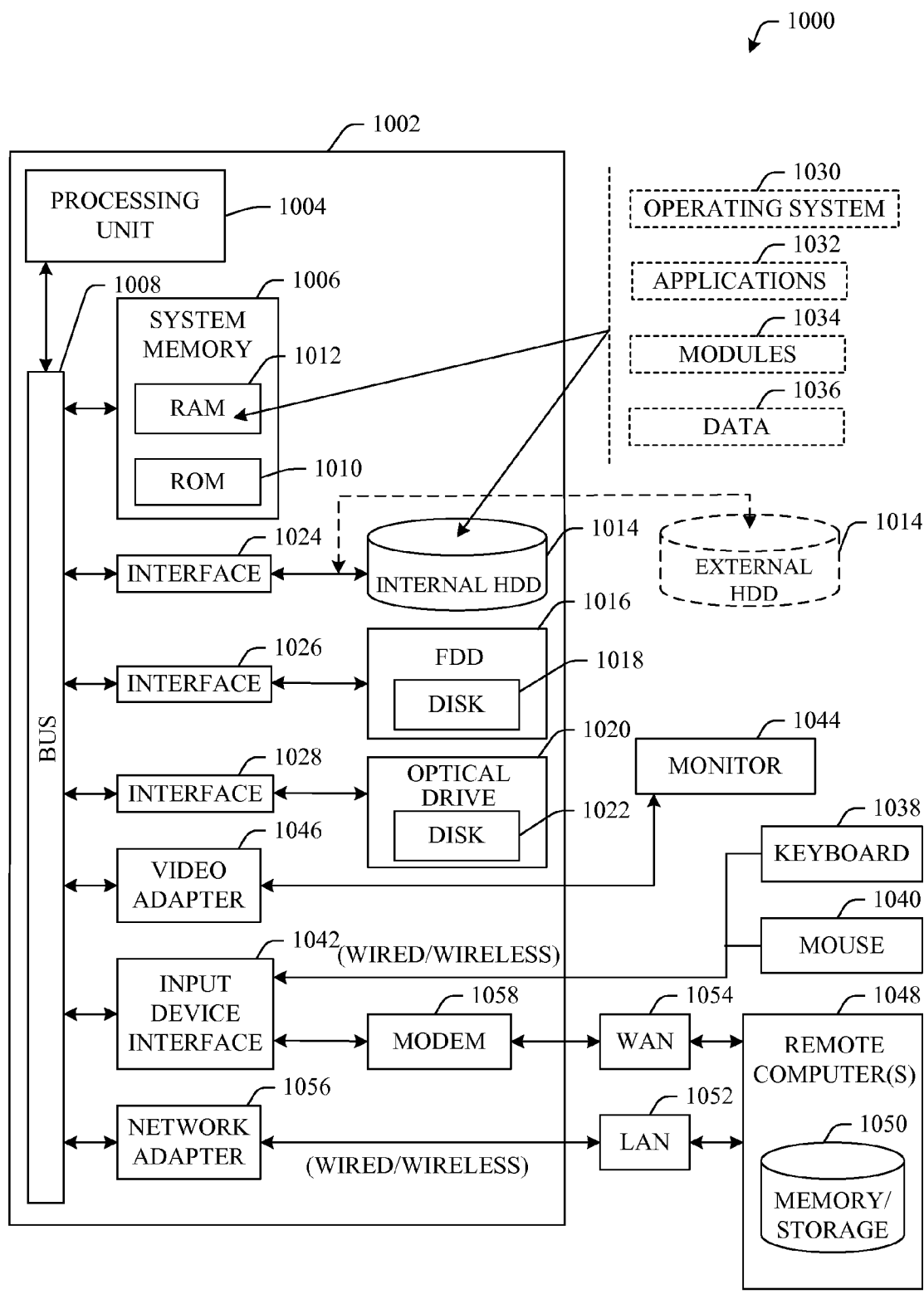
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies such as IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   employing one or more processors executing computer executable instructions embodied on one or more non-transitory computer readable storage mediums to perform the following:
   identifying inconsistent data portions in a response to a query of an industrial control configuration;
   determining an amount of difference between the inconsistent data portions;
   determining that the inconsistent data portions are critical to answering the query; and
   in response to determining that the inconsistent data portions are critical to answering the query and further in response to determining the amount of difference exceeds a predetermined tolerance, designating resolution of the inconsistency.

2. The method of claim 1, further comprising resolving the inconsistency.

3. The method of claim 2, resolving the inconsistency comprises:
   analyzing the inconsistent data portions;
   designating a correct data portion; and
   appointing the correct data portion as the response to the query.

4. The method of claim 3, further comprising propagating the correct data portion upon at least one incorrect data portion.

5. The method of claim 1, wherein the inconsistent data portions originate from at least two different nodes of a distributed directory having different information.

6. The method of claim 1, further comprising:
   designating the query;
   analyzing the query;
   discovering data portions that can answer the query; and
   selecting at least two data portions from the discovered data portions to provide in the response to the query.

7. The method of claim 6, further comprising:
   determining that an origin of the inconsistency is slow data propagation of the inconsistent data portions; and
   increasing data propagation speed of the inconsistent data portions.

8. The method of claim 1, wherein the identifying that there are inconsistent data portions in a response to a query, further comprises comparing at least two data portions of the response to the query.

9. A non-transitory computer-readable medium having instructions stored thereon that, in response to execution, cause a processor to perform operations comprising:
   identifying inconsistent data portions in a response to a query to a distributed directory relating to an industrial control configuration; and
   determining an amount of difference between the inconsistent data portions;
   determining that the inconsistent data portions are critical to answering the query; and
   in response to determining that the inconsistent data portions are critical to answering the query and further in response to the amount of difference exceeds a predetermined tolerance, resolving the inconsistency.

* * * * *